(12) United States Patent
Sugiki et al.

(10) Patent No.: US 7,236,442 B2
(45) Date of Patent: Jun. 26, 2007

(54) HOLOGRAPHIC RECORDING/REPRODUCING APPARATUS AND REPRODUCING APPARATUS FOR HOLOGRAPHICALLY RECORDED INFORMATION

(75) Inventors: Mikio Sugiki, Kanagawa (JP); Kazuo Takahashi, Tokyo (JP); Shigeo Kobayashi, Chiba (JP); Tomiji Tanaka, Miyagi (JP); Koji Ishioka, Kanagawa (JP); Kenjiro Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 629 days.

(21) Appl. No.: 10/702,446

(22) Filed: Nov. 7, 2003

(65) Prior Publication Data

US 2004/0156083 A1  Aug. 12, 2004

(30) Foreign Application Priority Data

Dec. 11, 2002  (JP) .......................... P2002-359953

(51) Int. Cl.
  *G11B 7/00* (2006.01)
(52) U.S. Cl. ................... 369/103; 369/112.01
(58) Field of Classification Search ...................... None
  See application file for complete search history.

(56) References Cited

U.S. PATENT DOCUMENTS

| | | | | |
|---|---|---|---|---|
| 5,917,798 A | * | 6/1999 | Horimai et al. | 369/103 |
| 6,256,281 B1 | * | 7/2001 | Tanaka et al. | 369/103 |
| 6,490,061 B1 | * | 12/2002 | Tanaka et al. | 359/22 |
| 2002/0154589 A1 | * | 10/2002 | Tanaka et al. | 369/103 |

\* cited by examiner

Primary Examiner—William Korzuch
Assistant Examiner—Tawfik Goma
(74) Attorney, Agent, or Firm—Oblon, Spivak, McClelland, Maier & Neustadt, P.C.

(57) ABSTRACT

A holographic recording/reproducing apparatus includes a splitter unit for splitting a laser beam into a first laser beam for generating a signal beam and a second laser beam which serves as a reference beam, a spatial light modulator for spatially modulating the first laser beam in accordance with information to be recorded, the modulated first laser beam serving as the signal beam, and a first lens system for focusing the signal beam and the reference beam onto a holographic recording medium. In a recording process, the signal beam and the reference beam are guided through one and the other half-regions separated along the optical axis of the first lens system. In a reproduction process, only the reference beam is guided through one of the half-regions and a signal reproduction beam from the holographic recording medium is guided through a second lens system in the other half-region.

8 Claims, 15 Drawing Sheets

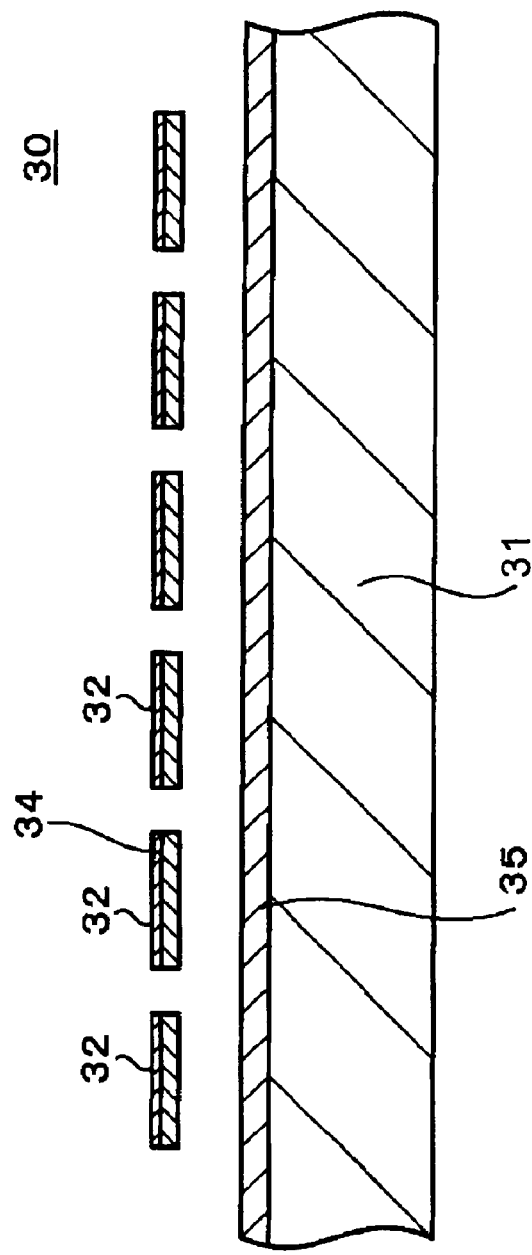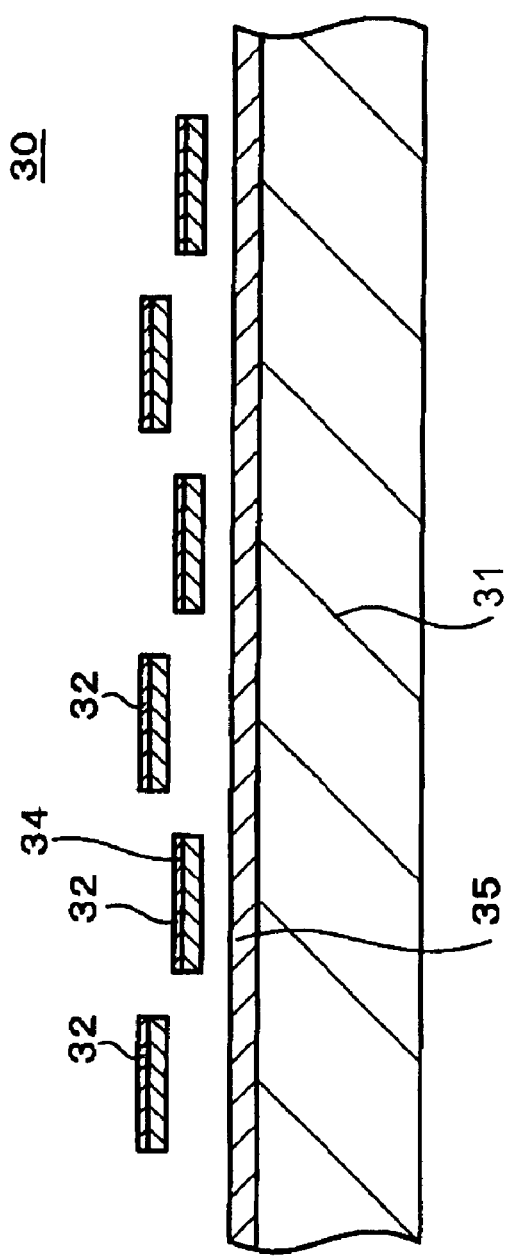

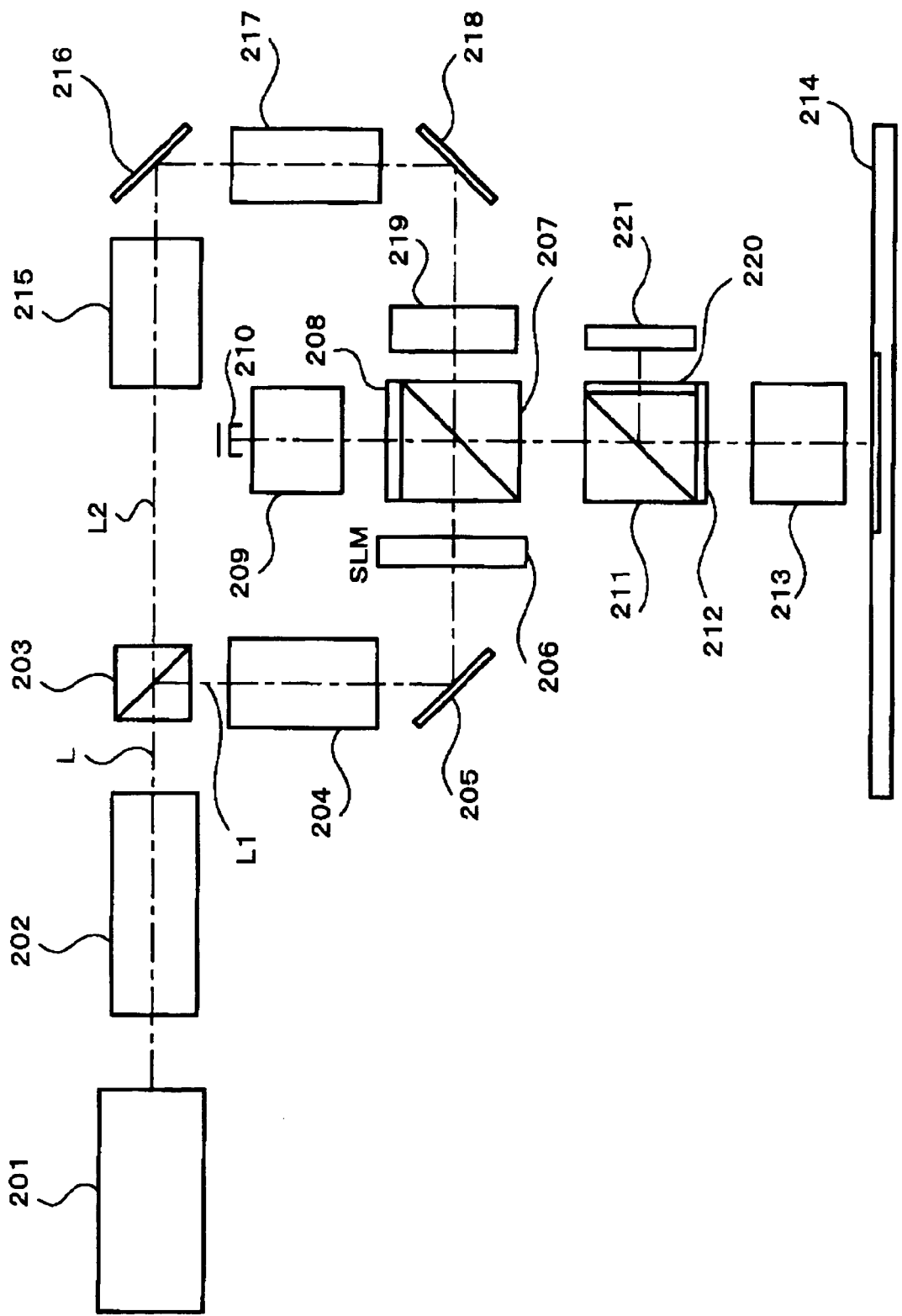

HOLOGRAPHIC RECORDING/REPRODUCING APPARATUS AND REPRODUCING APPARATUS FOR HOLOGRAPHICALLY RECORDED INFORMATION

BACKGROUND OF THE INVENTION

1. Field of the Invention

The present invention relates to a holographic recording/reproducing apparatus which either records or records and reproduces information holographically, and also relates to a reproducing apparatus which reproduces holographically recorded information.

2. Description of the Related Art

In a typical holographic recording system, a laser beam from a laser source is split along two optical paths. One of the split laser beams is spatially modulated by a spatial light modulator in accordance with information to be recorded, and the thus modulated laser beam serves as a signal beam. The other one of the split laser beams serves as a reference beam. The signal beam and the reference beam are superimposed on a holographic recording medium so that the two laser beams interfere with each other and an interference pattern is formed on the holographic recording medium as a refractive index variation. Thus, the information is recorded on the holographic recording medium.

When the thus recorded information is reproduced, the signal beam is blocked and only the reference beam is directed onto the holographic recording medium at the same incident position and incident angle as those in the recording process. A diffracted beam corresponding to the original signal beam is obtained from the interference pattern on the holographic recording medium as a reproduction beam, and the reproduction beam is detected by a charge coupled device (CCD) sensor or the like.

The above-described holographic recording system can also perform multiplexed holographic recording. Multiplexed holographic recording is performed by, for example, an angular multiplexing method in which the incident angle of the reference beam on the holographic recording medium at the position where the signal beam is directed is varied or by a shifting method in which the reference beam is shifted in the multiplexing direction.

FIG. 14 is a schematic diagram showing the construction of a known holographic recording/reproducing apparatus. In this apparatus, a laser beam L from a laser source 101 is split into two laser beams L1 and L2 by a beam splitter 102. The laser beam L1 is guided through a shutter 103 and a lens system 104 into a polarization beam splitter (PBS) 105, and is incident on a reflective spatial light modulator (SLM) 106. The laser beam L1 is spatially modulated by the spatial light modulator 106 in accordance with information to be recorded, and the thus modulated laser beam L1 serves as a signal beam. The signal beam passes through the polarization beam splitter 105 and a first lens system 107, which serves as a Fourier-transform (FT) lens, and is directed onto a holographic recording medium 108.

The other laser beam L2 split by the beam splitter 102 is reflected by a mirror on a so-called page motor such that the reflection angle can be changed, and is focused onto the holographic recording medium 108 by a second lens system 110 as a reference beam. Accordingly, the signal beam and the reference beam interfere with each other and the information is recorded holographically.

When the thus recorded information is reproduced, the signal beam is blocked by closing the shutter 103 and only the laser beam L2, which serves as the reference beam, is directed onto the holographic recording medium 108 along the same optical path as that in the recording process. Accordingly, a reproduction beam corresponding to the recorded information is extracted from the back of the holographic recording medium 108, that is, from the side opposite to that on which the signal beam is incident. The reproduction beam is guided through a third lens system 111, which serves as an inverse Fourier-transform (IFT) lens, and is detected by a CCD sensor 112 or the like (refer to, for example, "Holographic Data Storage" edited by H. J. Coufal, D. Psaltis, and G. T. Sincerbox, Springer Series in Optical Sciences, Springer Verlag, July 2000, p. 350). Thus, a transmissive holographic recording medium is used as the holographic recording medium in this apparatus.

In the above construction, each of the first, second, and third lens systems 107, 110, and 111 has a complex lens structure including a lens group obtained by combining a plurality of lenses in order to increase the field of view and improve the focus performance, and therefore the apparatus is large and expensive.

Apparatuses using a holographic recording medium having a reflective film are also disclosed (refer to, for example, Optical Data Storage 2001, Proceedings of SPIE Vol. 4342 (2002), p. 567).

FIG. 15 is a schematic diagram showing the construction of another known holographic recording/reproducing apparatus which uses a holographic recording medium having a reflective film. In this apparatus, a laser beam L from a laser source 201 is expanded by a beam expander 202 and is split into two laser beams L1 and L2 by a beam splitter 203. The laser beam L1 passes through a beam shaper 204, is reflected by a mirror 205, is guided into a spatial light modulator (SLM) 206, and is modulated in accordance with information to be recorded, and the thus modulated laser beam L1 serves as a signal beam. The signal beam is reflected by a polarization beam splitter 207, passes through a quarter-wave plate 208, is focused by a first lens system 209, which is a lens group serving as a recording/reproducing lens system, and is reflected by a mirror 210. The reflected signal beam passes through the lens system 209 and the quarter-wave plate 208 again so that its plane of polarization changes. Accordingly, the signal beam passes through the polarization beam splitter 207. Then, the signal beam passes through a polarization beam splitter 211, a quarter-wave plate 212, and a second lens system 213, which is a lens group serving as an objective lens, and is directed onto a holographic recording medium 214.

The other laser beam L2 split by the beam splitter 203 is used as a reference beam. The laser beam L2 passes through a beam shaper 215, where the shape of the laser beam L2 is adjusted, is guided into the polarization beam splitter 207 via a mirror 216, a beam contractor 217, a mirror 218, and a Fourier-transform (FT) lens 219, is reflected by the polarization beam splitter 207, passes through the polarization beam splitter 211, the quarter-wave plate 212, and the second lens system 213, and is directed onto the holographic recording medium 214 at the same position as the signal beam.

Accordingly, the signal beam and the reference beam interfere with each other and the information is recorded on the holographic recording medium 214.

When the thus recorded information is reproduced, the signal beam is blocked and only the laser beam L2, which serves as the reference beam, is directed onto the holographic recording medium 214 along the same optical path as that in the recording process. Accordingly, a reproduction beam corresponding to the signal beam is extracted from the front of the holographic recording medium 214, that is, from the same side as that on which the signal beam is incident. The reproduction beam is guided through the second lens system 213 and the quarter-wave plate 212 into the polarization beam splitter 211, is reflected by the polarization beam splitter 211, and is detected by a CCD sensor 211 or the like via a polarizer filter 220.

In the above apparatus which uses a reflective holographic recording medium, that is, a holographic recording medium having a reflective film, the first and second lens systems have a large and complex lens structure. Therefore, compared to the apparatus shown in FIG. 14 which uses a transmissive holographic recording medium, the structure of the entire lens system can be simplified.

However, in this construction, the reference beam reflected by the holographic recording medium 214 is also received by the sensor 221 in the reproduction process. Therefore, the signal-to-noise (S/N) ratio decreases due to the increase in noise and the efficiency of sensor elements also decreases, which results in lower recording density.

SUMMARY OF THE INVENTION

The present invention provides a holographic recording/reproducing apparatus which either records or records and reproduces information holographically and a reproducing apparatus which reproduces holographically recorded information. The holographic recording/reproducing apparatus and the reproducing apparatus for holographically recorded information according to the present invention are small and inexpensive, use small number of lens systems which have a large and complex structure, and reproduce the information with low noise by preventing the reference beam from being mixed with the information reproduction beam.

According to one aspect of the present invention, a holographic recording/reproducing apparatus which either records or records and reproduces information holographically includes a laser source; a splitter unit which splits a laser beam from the laser source into a first laser beam for generating a signal beam and a second laser beam which serves as a reference beam; a spatial light modulator (SLM) which spatially modulates the first laser beam in accordance with the information to be recorded, the modulated first laser beam serving as the signal beam; a positioning unit for positioning a holographic recording medium; and a focusing lens system which focuses the signal beam and the reference beam onto the holographic recording medium.

In a recording process, the signal beam passes through the focusing lens system such that the central axis of the signal beam is in one of the half-regions separated along the optical axis of the focusing lens system and the reference beam passes through the focusing lens system in the other half-region which is free from the signal beam, the signal beam and the reference beam being focused onto the holographic recording medium so that the information is recorded on the holographic recording medium.

In the holographic recording/reproducing apparatus according to the present invention, the holographic recording medium may be a transmissive holographic recording medium. In such a case, the focusing lens system is a first lens system and the holographic recording/reproducing apparatus further includes a second lens system which faces the first lens system across the positioning unit.

In the recording process, the signal beam passes through the focusing lens system such that the central axis of the signal beam is in one of the half-regions separated along the optical axis of the focusing lens system and the reference beam passes through the focusing lens system in the other half-region which is free from the signal beam, the signal beam and the reference beam being focused onto the holographic recording medium so that the information is recorded on the transmissive holographic recording medium.

In a reproduction process of reproducing the information recorded on the holographic recording medium, the first laser beam is blocked, for example, stopped, and the reference beam is directed onto the holographic recording medium at the same incident position and incident angle as those of the reference beam in the recording process. Accordingly, a signal reproduction beam corresponding to the signal beam is generated in accordance with the information recorded on the holographic recording medium, and the signal reproduction beam is guided through the second lens system such that the signal reproduction beam is point symmetric to the signal beam in the recording process across the holographic recording medium.

Alternatively, in the holographic recording/reproducing apparatus according to the present invention, the holographic recording medium may have a reflective film. In such a case, in the recording process, the signal beam passes through the focusing lens system such that the central axis of the signal beam is in one of the half-regions separated along the optical axis of the focusing lens system and the reference beam passes through the focusing lens system in the other half-region which is free from the signal beam, the signal beam and the reference beam being focused onto the holographic recording medium so that the information is recorded on the holographic recording medium having the reflective film.

In a reproduction process of reproducing the information recorded on the holographic recording medium, the first laser beam is blocked, for example, stopped, and the reference beam is directed onto the holographic recording medium at the same incident position and incident angle as those of the reference beam in the recording process. Accordingly, a signal reproduction beam corresponding to the signal beam is generated in accordance with the information recorded on the holographic recording medium, and the signal reproduction beam is guided through the focusing lens system such that the signal reproduction beam is symmetric to the signal beam in the recording process about the optical axis of the focusing lens system.

According to another aspect of the present invention, a reproducing apparatus holographically recorded information includes a laser source; a positioning unit for positioning a transmissive holographic recording medium on which the information is recorded; a first lens system which is a focusing lens system disposed between the positioning unit and the laser source; and a second lens system which faces the first lens system across the holographic recording medium.

A reference beam from the laser source is guided through the first lens system in one of the half-regions separated along the optical axis of the first lens system and is focused onto the holographic recording medium at the same incident position and incident angle as those in the process of recording the information on the holographic recording medium, and a signal reproduction beam from the holographic recording medium is guided through the second lens system in the other half-region.

According to another aspect of the present invention, a reproducing apparatus for holographically recorded information includes a laser source; a positioning unit for positioning a holographic recording medium which has a reflective film and on which the information is recorded; and a lens system disposed between the positioning unit and the laser source.

A reference beam from the laser source is guided through the lens system in one of the half-regions separated along the optical axis of the lens system and is focused onto the holographic recording medium at the same incident position and incident angle as those in the process of recording the information on the holographic recording medium, and a signal reproduction beam from the holographic recording medium is guided through the lens system in the other half-region.

According to the holographic recording/reproducing apparatus and the reproducing apparatus for the holographically recorded information of the present invention, the signal beam and the reference beam for recording the information holographically are directed onto the holographic recording medium mainly using one and the other half-regions of a common lens system. Therefore, the number of lens systems having a large and complex lens structure can be reduced.

In addition, when the holographic recording medium has a reflective film, the lens system used for reproducing the information can be omitted.

Although the lens system is used in common for both the signal beam and the reference beam, the reference beam reflected by the holographic recording medium can be prevented from being mixed with the reproduction beam in the reproduction process since the signal beam and the reference beam travel along different optical paths. Accordingly, the reproduction characteristics can be improved.

Thus, according to the present invention, the size and cost of the apparatus can be reduced and the apparatus can be easily operated.

In addition, when the holographic recording medium having a reflective film is used, the lens system used for reproducing the information in the case in which the transmissive holographic recording medium is used can be omitted. Thus, the size and cost of the apparatus can be further reduced and the apparatus can be more easily operated.

Even when the reflective holographic recording medium is used, the reference beam can be prevented from being received by the sensor and the S/N ratio can be increased since the direction in which the reproduction beam is emitted from the holographic recording medium and the reflection direction of the reference beam are different from each other due to the difference in the incident direction between the signal beam and the reference beam. Accordingly, the present invention provides various important advantages.

BRIEF DESCRIPTION OF THE DRAWINGS

FIGS. 9A and 9B are sectional views showing operational states of the spatial light modulator;

FIG. 15 is a diagram showing the construction of another known holographic recording/reproducing apparatus.

DESCRIPTION OF THE PREFERRED EMBODIMENTS

Recording/Reproducing Apparatus

A holographic recording/reproducing apparatus which either records or records and reproduces information holographically according to an embodiment of the present invention will be described below. However, the present invention is not limited to this.

First Embodiment

Figure 1:
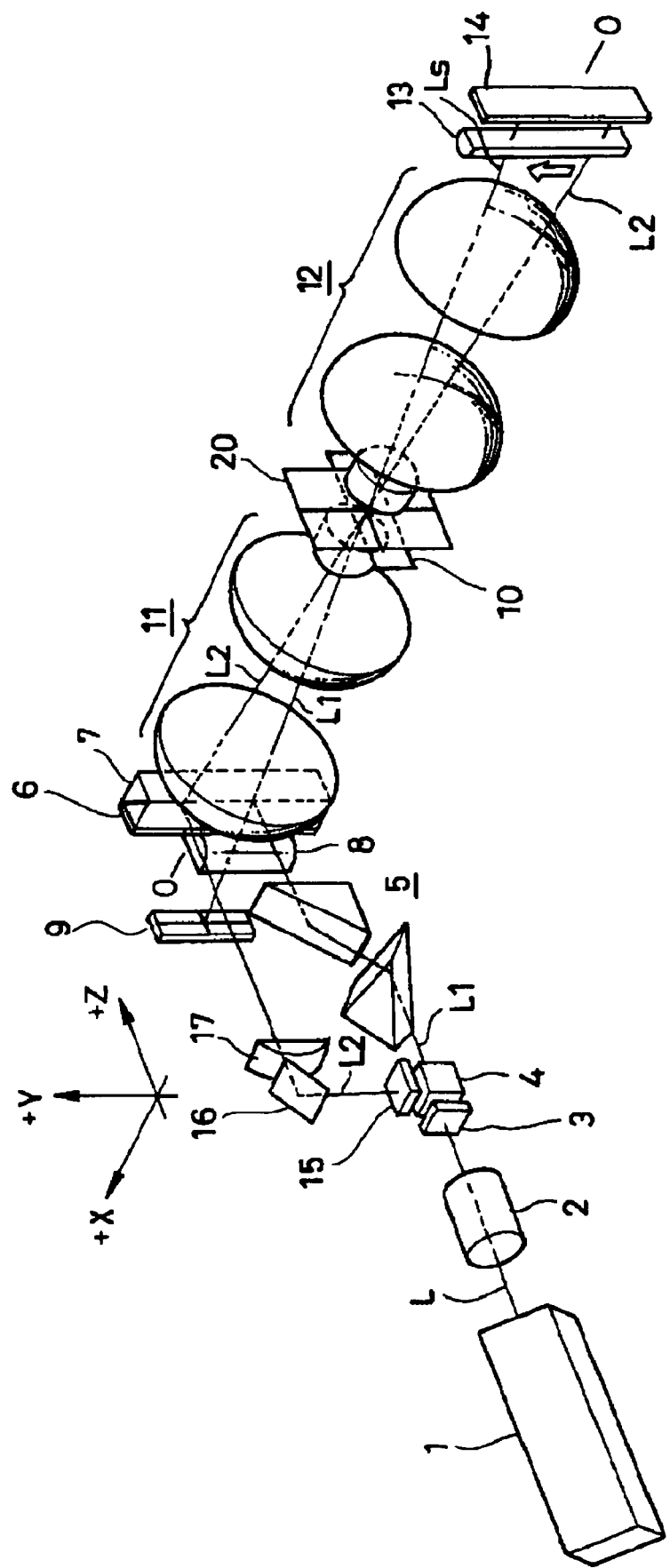
FIG. 1 is a schematic diagram showing the construction of a holographic recording/reproducing apparatus according to a first embodiment of the present invention.

A holographic recording/reproducing apparatus according to a first embodiment uses a transmissive holographic recording medium and records information by a Fourier-transform recording method. FIG. 1 is a schematic diagram showing the construction of the holographic recording/reproducing apparatus.

The holographic recording/reproducing apparatus according to the first embodiment includes a laser source 1; a beam expander 2; a half-wave plate (HWP) 3; a polarization beam splitter (PBS) 4 which serves as a splitter unit and splits a laser beam along two optical paths; an anamorphic prism 5; an optical component composed of a quarter-wave plate (QWP) 6 and a polarization beam splitter (PBS) 7 which are integrated with each other; a cylindrical lens 8; a spatial light modulator 9; a first lens system 11 which serves as a wide-angle Fourier-transform (FT) lens; a limiting plate 10 having an aperture; a holographic recording medium 20; a second lens system 12 which has the same optical axis as that of the first lens system 11 and which serves as a wide-angle inverse Fourier-transform (IFT) lens; a cylindrical lens 13; and a sensor 14 which is, for example, a CCD-array sensor.

In addition, a half-wave plate 15, a mirror 16, and a cylindrical lens 17 are disposed on an optical path split by the polarization beam splitter 4 which serves as the splitter unit.

The laser source 1 is, for example, a semiconductor laser which emits a green laser beam with a wavelength $\lambda$ of 532 nm. A laser beam L emitted from the laser source 1 travels in the +Z direction shown in FIG. 1, is increased in diameter by the beam expander 2, and is split into first and second beams L1 and L2 which respectively travels in the +Z direction and the +Y direction which is perpendicular to the Z direction by the polarization beam splitter 4 which serves as the splitter unit.

More specifically, as shown in FIG. 1, the laser beam L passes through the half-wave plate 3 where the polarization planes are determined, and is guided into the polarization beam splitter 4. The polarization beam splitter 4 allows the laser beam L1 having a predetermined polarization plane to pass straight through the polarization beam splitter 4 in the +Z direction and splits the laser beam L2 having a polarization plane perpendicular to that of the laser beam L1 in the +Y direction.

Figure 2:
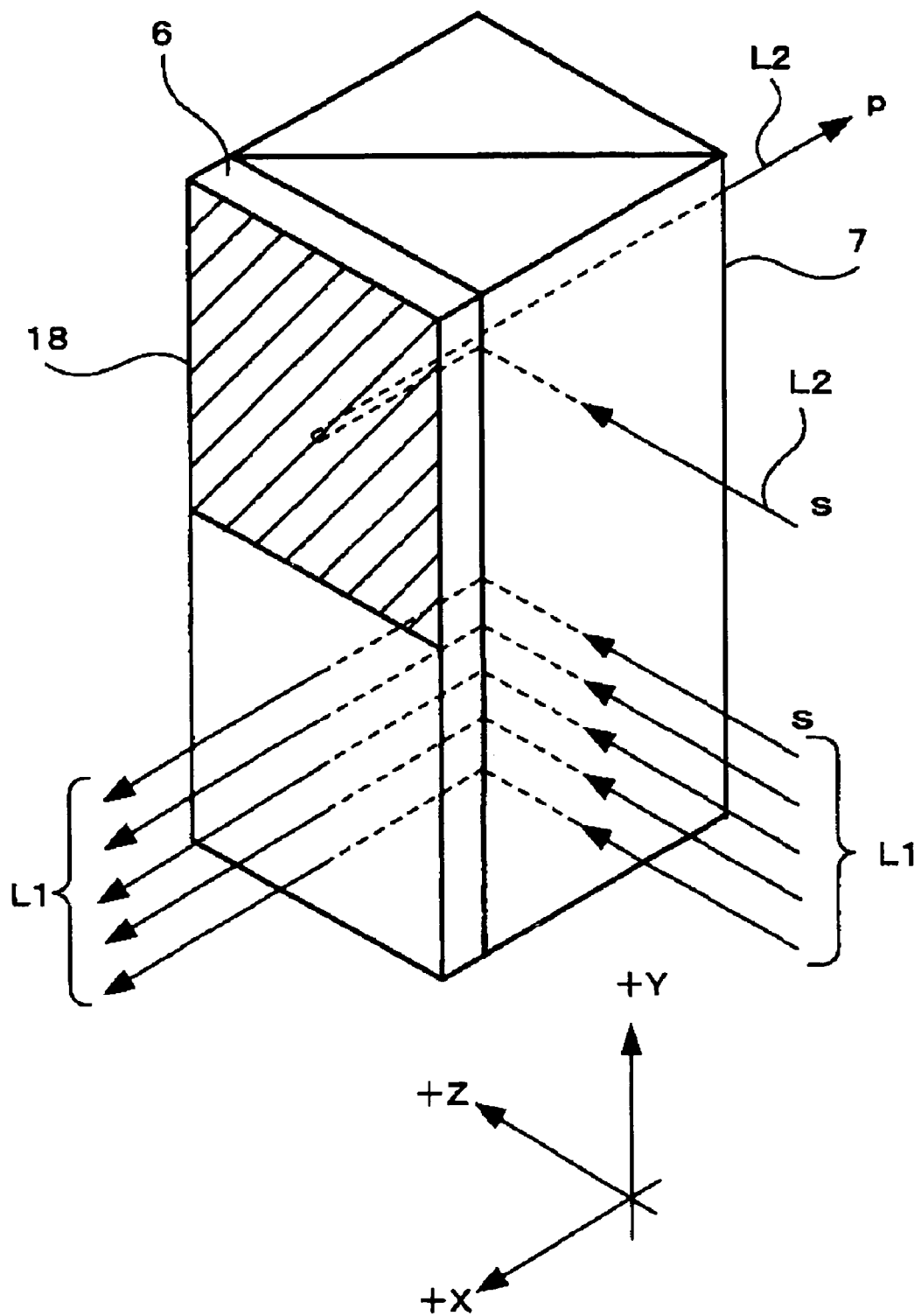
FIG. 2 is a perspective view showing the construction of the main part of the holographic recording/reproducing apparatus.

The first laser beam L1 is collimated and is increased in width (expanded in the Y direction in FIG. 1) by the anamorphic prism 5. The thus expanded laser beam L1 is guided into the polarization beam splitter 7 as an s-wave, as shown in FIG. 2, which is a perspective view of the optical component composed of the quarter-wave plate 6 and the polarization beam splitter 7, and FIG. 3, which is a plan view of a part of the holographic recording/reproducing apparatus including the optical component.

In the optical component composed of the quarter-wave plate 6 and the polarization beam splitter 7, the laser beam L1 is reflected by the polarization beam splitter 7 and leaves the polarization beam splitter 7 through a surface perpendicular to the surface on which the laser beam L1 is incident. In addition, the quarter-wave plate 6 is provided integrally on the exit surface of the polarization beam splitter 7.

A reflective surface 18 is provided on, for example, one-half of the outer face of the quarter-wave plate 6 in the Y direction (the upper half in FIG. 2) such that the laser beam L1 is not blocked.

The laser beam L1 is reflected by the polarization beam splitter 7, passes through the quarter-wave plate 6, is focused in the Z direction by the cylindrical lens 8 whose focal lengths fx are, for example, 30 mm and −60 mm, and is directed onto the spatial light modulator 9 in a linear form.

Figure 3:
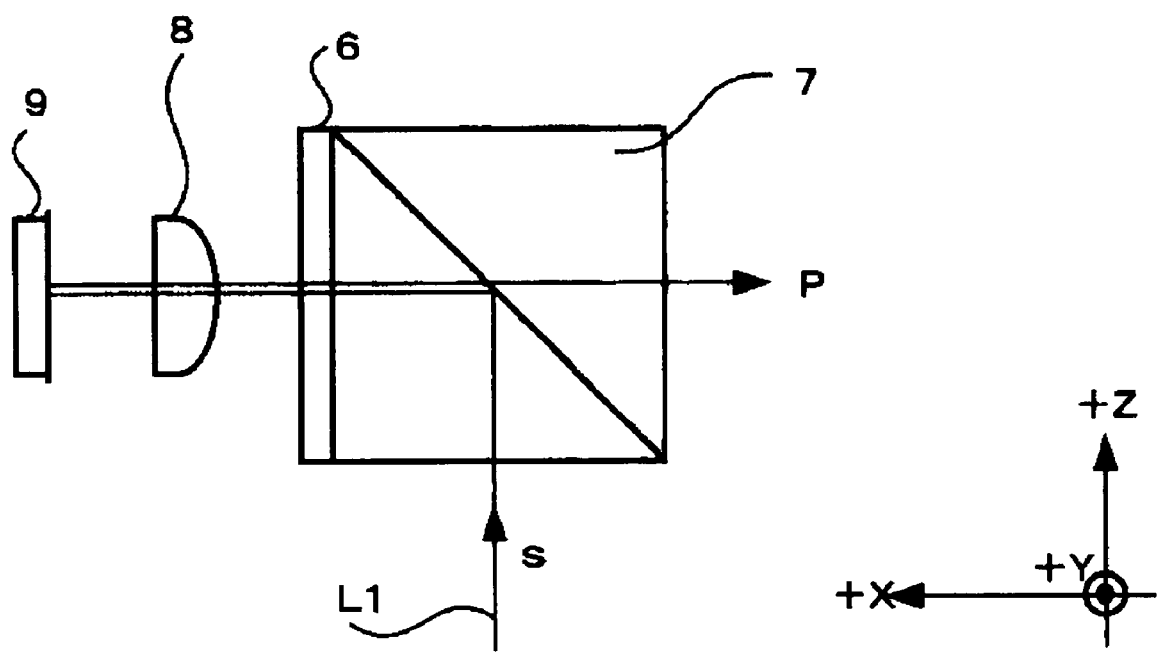
FIG. 3 is a plan view showing the construction of the main part of the holographic recording/reproducing apparatus.

The laser beam L1 is modulated by the spatial light modulator 9 in accordance with information to be recorded, and the thus modulated laser beam L1 serves as a signal beam. The modulated laser beam L1 passes through the cylindrical lens 8 and the quarter-wave plate 6, and is incident on the polarization beam splitter 7. Since the laser beam L1 passes through the quarter-wave plate 6 twice in opposite directions, the polarization plane thereof rotates by 90°. Accordingly, the laser beam L1 becomes a p-wave and passes straight through the polarization beam splitter 7 without being reflected, as shown in FIG. 3. Then, the laser beam L1 is incident on the first lens system 11, which serves as the wide-angle Fourier-transform (FT) lens, and is focused by the first lens system 11 onto the holographic recording medium 20 via the aperture in the limiting plate 10.

Figure 4:
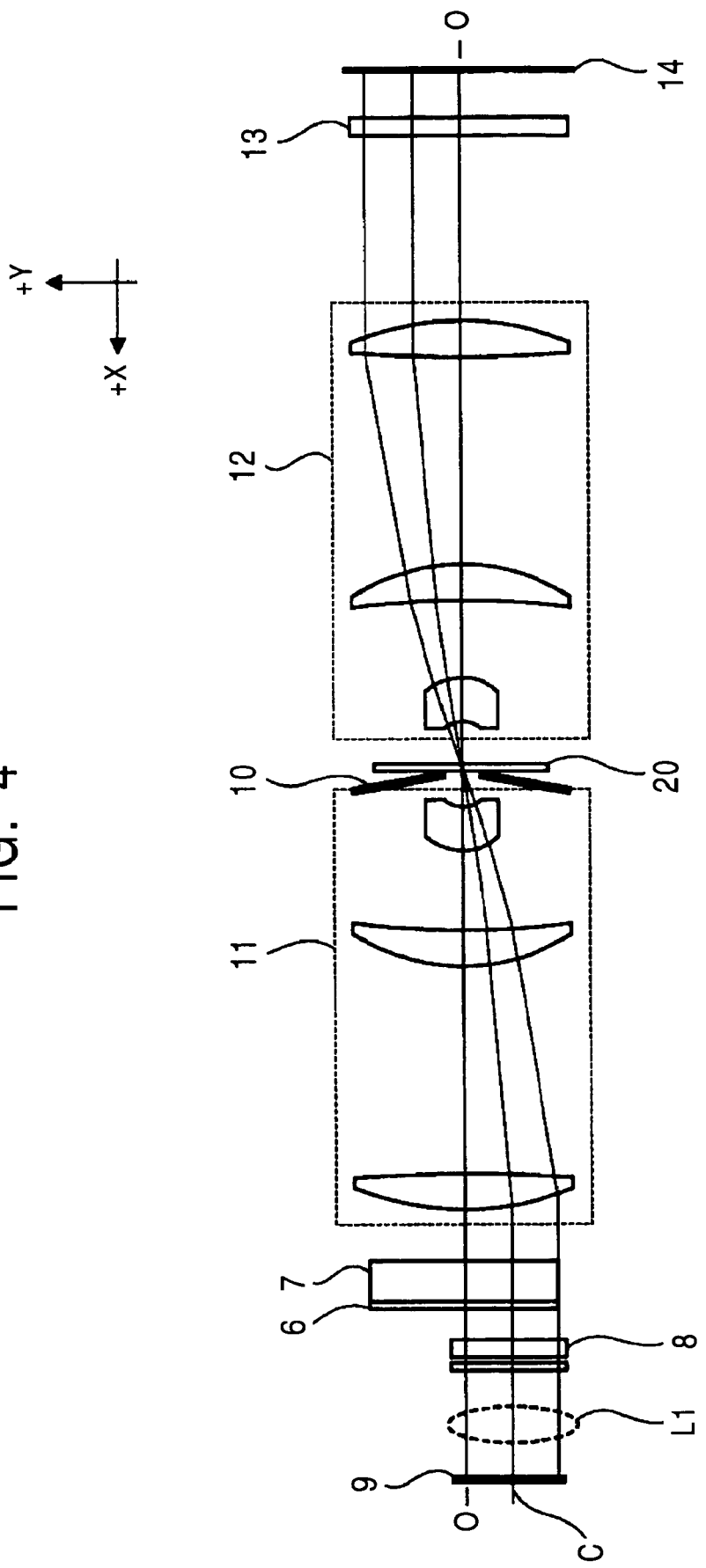
FIG. 4 is a diagram showing an optical path in the holographic recording/reproducing apparatus.

FIG. 4 is a diagram showing the optical path of the laser beam L1 which is modulated by the spatial light modulator 9. A Grating Light Valve™ (GLV™) array, which will be described below, is used as the spatial light modulator 9, and the signal beam, that is, the laser beam L1 modulated by the spatial light modulator 9 is incident on the first lens system 11, as shown in FIG. 4. At this time, the positions of the anamorphic prism 5, the cylindrical lens 8, etc., are determined such that the central axis of the laser beam L1 is in one of the half-regions separated along the optical axis of the first lens system 11.

FIG. 4 schematically shows optical paths of three components of the laser beam L1, the three components being modulated in correspondence with three pixels of the spatial light modulator 9. The optical path in the middle shows the optical axis of the component emitted from the spatial light modulator 9 along the central axis C of the spatial light modulator 9. As shown in FIG. 4, this optical path is in the lower half region below the optical axis O—O of the first lens system 11.

The spatial light modulator 9 is positioned at the front focal point of the first lens system 11, and the holographic recording medium 20 is positioned at the rear focal point of the first lens system 11. Accordingly, an optical Fourier transform image of the spatial light modulator 9, for example, the GLV array, is formed on the holographic recording medium 20.

The limiting plate 10 is disposed in front of the holographic recording medium 20 at a position near the rear focal point of the first lens system 11.

As shown in FIG. 1, the second laser beam L2 split by the polarization beam splitter 4 passes through the half-wave plate 15 and is reflected by the mirror 16 in a direction parallel to the first laser beam L1 on a plane including the Y and Z axes. Then, as shown in FIG. 2, the second laser beam L2 is incident as an s-wave on the same face of the polarization beam splitter 7 as that on which the first laser beam L1 is incident in a direction parallel to the first laser beam L1.

As shown in FIG. 2, the laser beam L2 is incident on the polarization beam splitter 7 in the upper region thereof where the reflective surface 18 is provided. Similar to laser beam L1, the laser beam L2 is reflected by the polarization beam splitter 7 and is guided into the quarter-wave plate 6. Then, the laser beam L2 is reflected by the reflective surface 18 and passes though the quarter-wave plate 6 again. Since the laser beam L2 passes through the quarter-wave plate 6 twice in opposite directions, the polarization plane thereof rotates by 90°. Accordingly, the laser beam L2 becomes a p-wave and passes straight through the polarization beam splitter 7. Then, the laser beam L2 is guided into the first lens system 11 in the other one of the half-regions separated along the optical axis of the first lens system 11, that is, the half-region which is free from the first laser beam L1, and is focused by the first lens system 11 onto the holographic recording medium 20 via the aperture in the limiting plate 10.

The cylindrical lens 17 whose focal length fy is, for example, 80 mm is disposed on the optical path of the laser beam L2 between the mirror 16 and the polarization beam splitter 7. The laser beam L2 is focused by the cylindrical lens 17 in the Y direction and diverges in a region behind the focal point thereof. The second laser beam L2 is used as a reference beam.

Figure 5A:
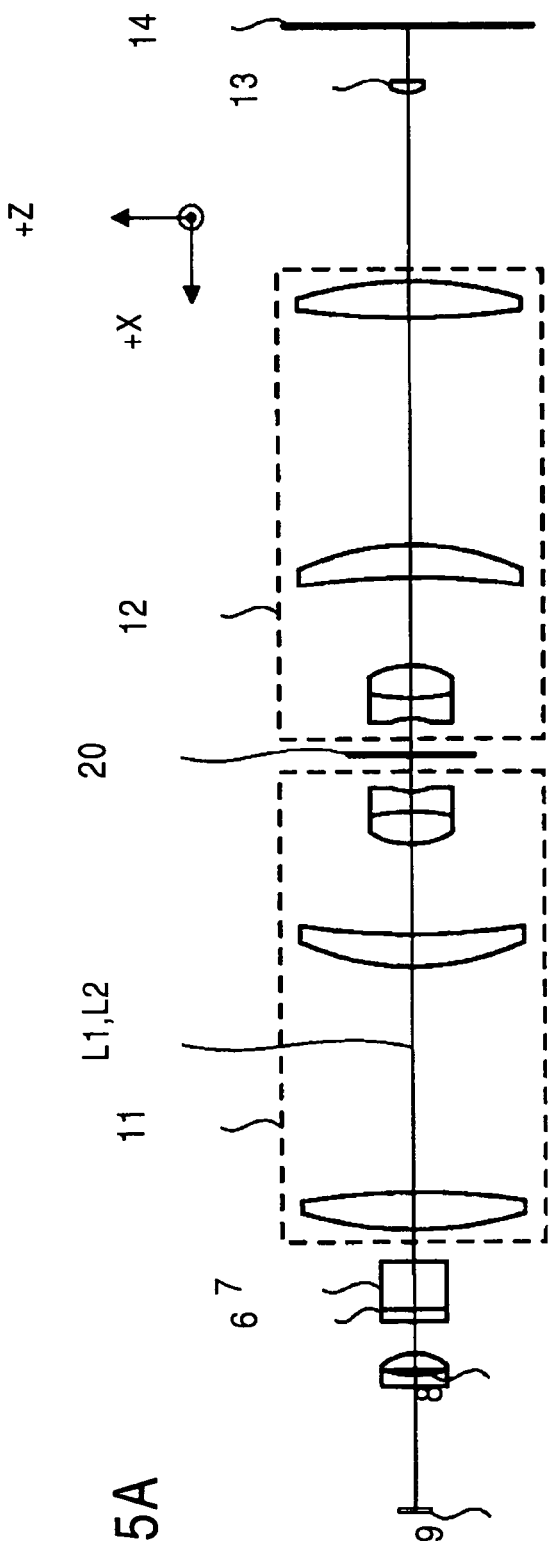
FIGS. 5A and 5B are a plan view and a side view, respectively, of optical paths in the holographic recording/reproducing apparatus.
Figure 5B:
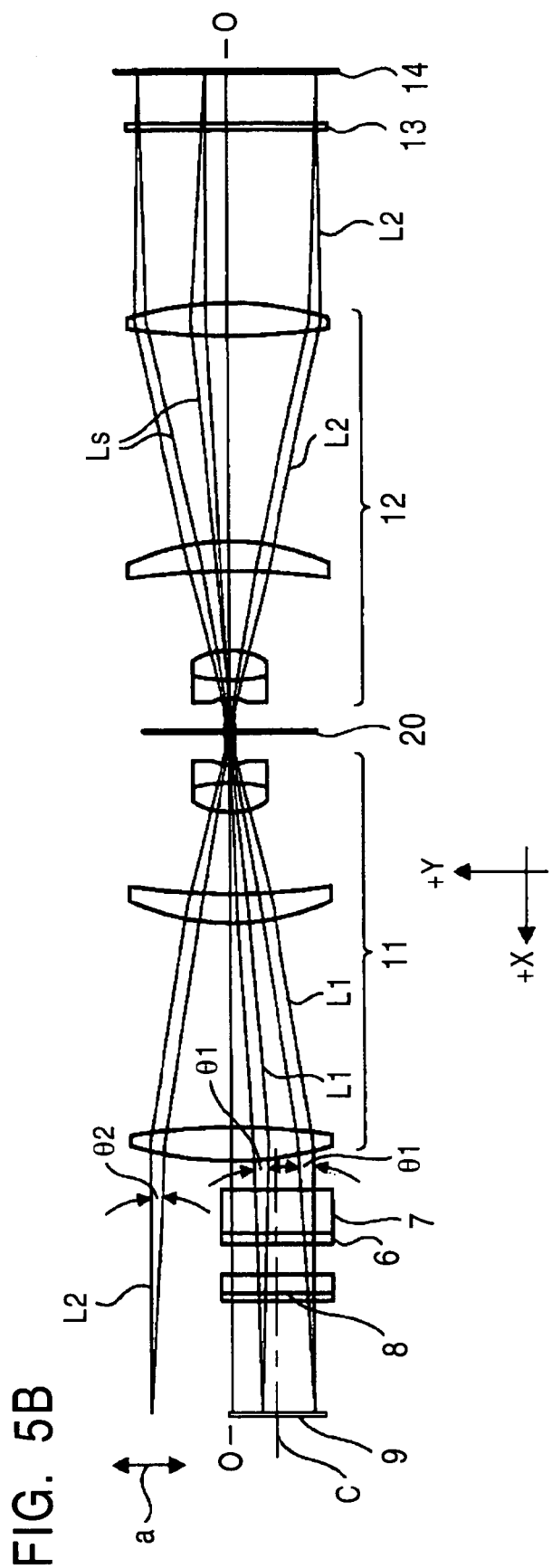

As shown in FIGS. 5A and 5B, which is a plan view and a sectional view, respectively, showing the optical paths of the laser beams L1 and L2, the laser beams L1 and L2 are both guided into the common lens system 11. In FIG. 5B, two components of the first laser beam L1 are representatively shown, the two components corresponding to two pixels of the spatial light modulator 9. As shown in FIG. 5B, the divergent angle θ2 of the reference beam L2 incident on the focusing lens system 11 is set to an angle corresponding to the divergent angle θ1 of the signal beam L1 on the focusing lens system 11 for a single pixel.

As described above, with reference to FIG. 5B, the first laser beam L1 is guided into the lens system 11 such that the modulated laser beam emitted from the spatial light modulator 9, which is the GLV array or the like, along the central axis C of the spatial light modulator 9 is in one of the half-regions separated along the optical axis O-O of the first lens system 11, and the second laser beam L2, which serves as the reference beam, is guided into the first lens system 11 in the other half-region.

Accordingly, the signal beam, that is, the first laser beam L1 modulated by the spatial light modulator 9 in accordance with the information to be recorded and the reference beam, that is, the second laser beam L2, are directed onto the holographic recording medium 20, and the information is recorded as an optical variation, for example, a refractive index variation caused by the interference between the signal beam and the reference beam.

The spatial light modulator 9 in the holographic recording/reproducing apparatus according to the present invention is preferably a controllable diffraction grating with high modulation efficiency and quick response time. For example, an electrostatically-driven linear GLV array may be used as the spatial light modulator 9.

Figure 6:
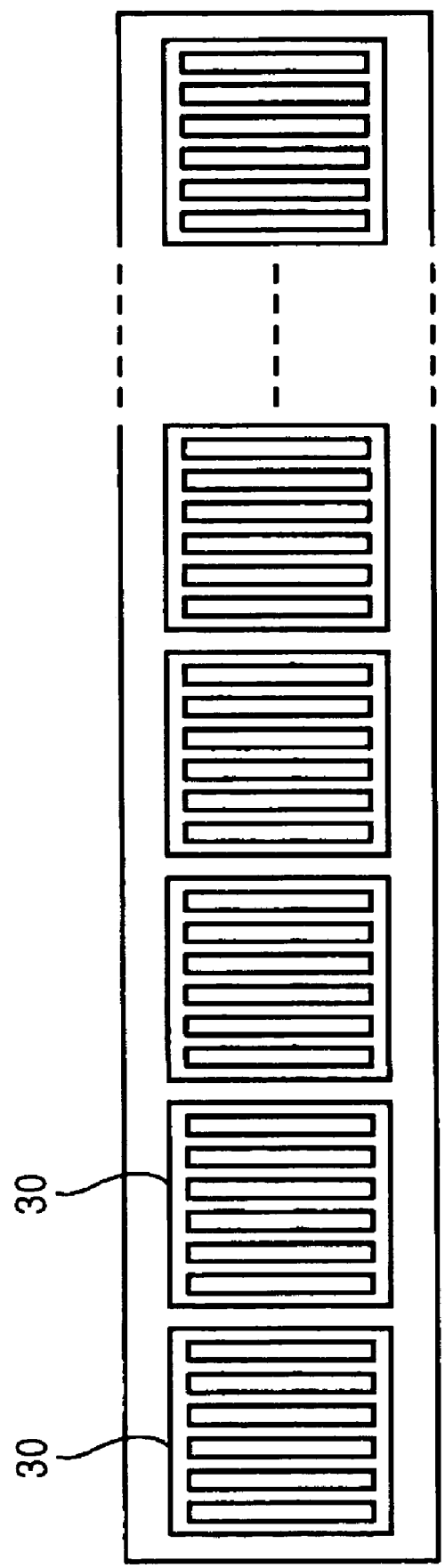
FIG. 6 is a plan view showing a spatial light modulator.

FIG. 6 shows a GLV array which serves as the spatial light modulator 9. The GLV array includes a plurality of (for example, 1088) pixels 30 arranged on a single line, each pixel 30 having a diffraction grating structure.

Figure 7:
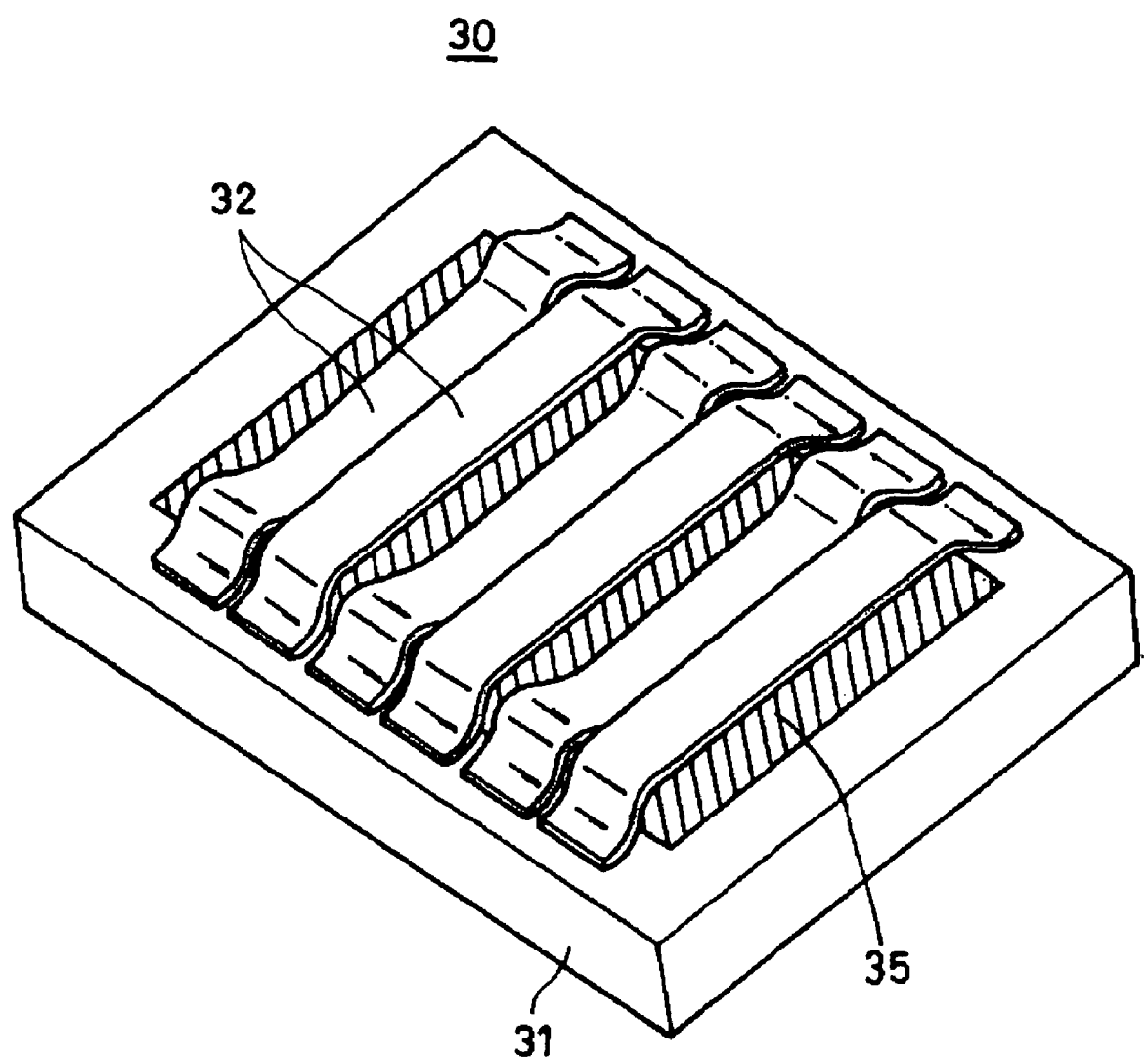
FIG. 7 is a perspective view of a single pixel in the spatial light modulator.
Figure 8:
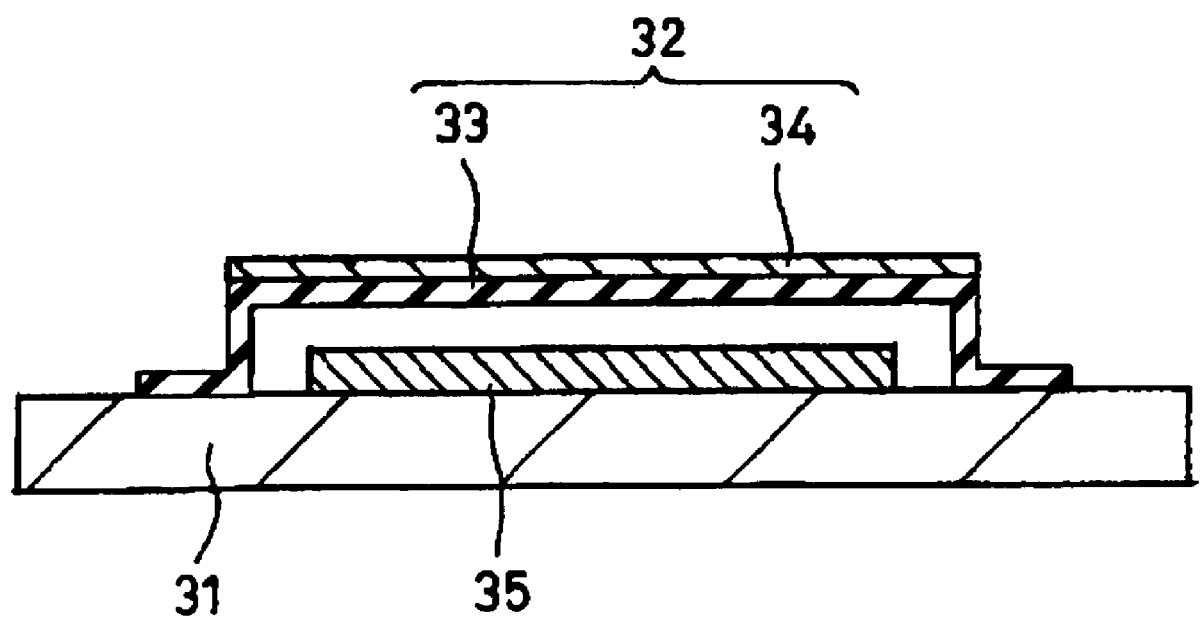
FIG. 8 is a sectional view of a single pixel in the spatial light modulator.

FIGS. 7 and 8 are a perspective view and a sectional view, respectively, of each pixel 30. As shown in FIGS. 7 and 8, each pixel 30 includes a silicon substrate 31 and six reflective ribbons 32 which are supported above the substrate 31 at both ends thereof. The ribbons 32 are arranged parallel to each other so as to form a diffraction grating and reflects the first laser beam L1.

As shown in FIG. 9A, which is the cross-sectional view of the pixel 30, the ribbons 32 are supported at both ends thereof such that the middle portions of the ribbons 32 are arranged on a plane at a predetermined distance from the surface of the substrate 31.

As shown in FIG. 8, each ribbon 32 is constructed by forming an electrode layer 34 composed of a metal film which provides a reflective surface on an insulating layer 33 composed of, for example, silicon nitride.

A common counter electrode 35 is provided on the substrate 31 such that the counter electrode 35 extends under the ribbons 32 and faces the electrode layers 34 of the ribbons 32 with a predetermined gap provided between the counter electrode 35 and the ribbons 32.

In the above construction, when a predetermined voltage is applied between the counter electrode 35 and the electrode layers 34 on alternate ribbons 32, the alternate ribbons 32 move toward the counter electrode 35, as shown in FIG. 9B, by a distance corresponding to $\lambda/4$, where $\lambda$ is the wavelength of the laser beam L1 directed onto the GLV array.

When the laser beam L1 is directed onto one of the pixels 30, the pixel 30 does not function as a diffraction grating if the six ribbons 32 in the pixel 30 is on the same plane, as shown in FIG. 9A. Therefore, the laser beam L1 is simply reflected by this pixel 30 and a signal beam representing, for example, "1" is obtained for this pixel. Accordingly, the information "1" is recorded on the holographic recording medium 20.

If the predetermined voltage is applied between the counter electrode 35 and the electrode layers 34 on the alternate ribbons 32 to obtain a signal representing, for example, "0" and the alternate ribbons 32 are displaced by $\lambda/4$, as shown in FIG. 9B, laser-beam components reflected by the adjacent ribbons 32 interfere with each other and the laser beam L1 is not reflected sufficiently. Therefore, the laser beam is substantially eliminated at this pixel and is modulated into a signal representing "0". Accordingly, the information "0" is recorded on the holographic recording medium 20.

When the spatial light modulator 9 having a diffraction grating structure is used as described above, ±1st order diffracted beams and higher-order diffracted beams of ±2nd order and more are generated. However, since the ±1st order diffracted beams are removed by the above-described limiting plate 10 and the intensity of the diffracted beams of ±2nd order or more is extremely small, they do not affect recording on the holographic recording medium.

The ribbons 32 in each pixel 30 may be, for example, 3 µm wide, 100 µm long, and 100 nm thick, and the distance between the counter electrode 35 and the ribbons 32 is set to, for example, 650 nm. In addition, the width of each pixel 30 may be, for example, 25 µm.

The GLV technology is explained in more detail in "Grating Light Valve Technology: Update and Novel Applications" by D. T. Amm and R. W. Corrigan, Society for Information Display Symposium, 1998.

In the holographic recording/reproducing apparatus of the first embodiment, a linear GLV array produced by Silicon Light Machines is used as the spatial light modulator 9.

The laser beam is not necessarily incident on the GLV array in a direction perpendicular to the plane including the ribbons, and the laser beam may also be incident at an angle. A similar operation is also performed in such a case.

Figure 10:
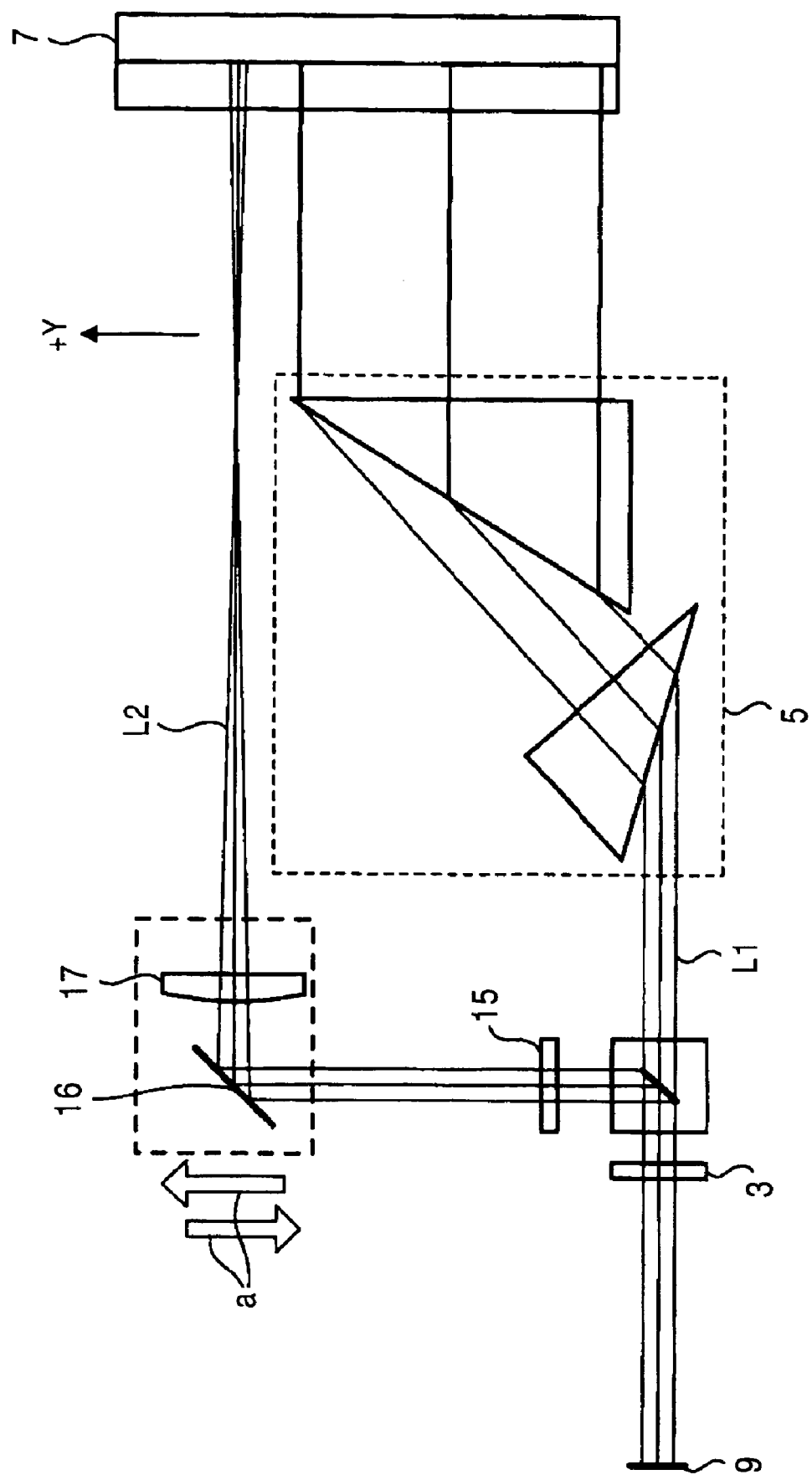
FIG. 10 is a diagram showing optical paths of first and second laser beams in the holographic recording/reproducing apparatus.

FIG. 10 shows the construction of a part of the holographic recording/reproducing apparatus shown in FIG. 1. With reference to FIG. 10, the mirror 16 and the cylindrical lens 17 can be moved in the Y direction as shown by the arrows a. Thus, the optical path of the second laser beam L2, which serves as the reference beam, is moved as shown by the double-ended arrow a in FIG. 5B such that the irradiation position on the holographic recording medium 20 covers the region irradiated by the first laser beam L1. Accordingly, angular-multiplexed recording is achieved.

In FIG. 10, components similar to those shown in FIG. 1 are denoted by the same reference numerals and redundant explanations are omitted.

With reference to FIGS. 1, 5A, and 5B, when the information recorded on the holographic recording medium 20 is reproduced, the first laser beam L1 is blocked by a shutter (not shown) or the like and the second laser beam L2, which serves as the reference beam, is directed onto the holographic recording medium 20 along the same optical path as that in the recording process. In this manner, the reference beam, that is, the second laser beam L2, is directed onto the holographic recording medium 20 at the position where the signal beam, that is, the first laser beam L1, is incident in the recording process.

Accordingly, a signal reproduction beam Ls corresponding to the signal beam is generated in accordance with the information recorded on the holographic recording medium 20. The signal reproduction beam Ls is diverged by the second lens system 12, which is the inverse Fourier-transform (IFT) lens, is focused in the Z direction by the cylindrical lens 13 with a focal length fx of, for example, 20 mm, and is guided into the sensor 14. Then, the optically recorded information is reproduced as an electric signal.

Multiplexed recording of the information can be performed for each line and the thus recorded information can be reproduced for each line. At this time, the reference beam L2 and the information reproduction beam Ls respectively passes through one and the other half-regions separated along the optical axis such that the reference laser beam L2 and the reproduction beam Ls are point symmetric to the reference beam and the signal beam, respectively, in the recording process.

Accordingly, the holographic recording/reproducing apparatus performs multiplexed recording. Multiplexed recording will be described in more detail below.

Multiplexed Recording

The case in which angular-multiplexed recording is performed will be described below. With reference to FIG. 5B, angular-multiplexed recording is performed by moving the reference beam (second laser beam) L2 in the vertical direction as shown by the double-ended arrow a and changing the incident angle on the holographic recording medium 20 in accordance with the position of the reference beam L2.

When the incident position is Yi and the focal length of the lens system 11 is F, an approximate incident angle θr on the holographic recording medium 20 is expressed as follows:

$$\tan(\theta r) = Yi/F \quad (1)$$

Accordingly, the incident angle θr can be changed by moving the mirror 16 and the cylindrical lens 17 in the vertical direction in FIG. 1, as described above.

When the focal length F is 87.9 mm and the radius $\phi y_{max}$ of the lens' field of view is 30 mm, the multiplicity can be obtained by a formula for angular multiplexing (see p. 3675 of Applied Optics, Vol. 33, No. 17, 10 Jun. 1994) as follows:

$$\delta\theta = вδ \cos(\theta s)/n\pi L \sin(\theta r + \theta s) \quad (2)$$

A minimum angular interval with which the angular multiplexing can be achieved is obtained by Equation (2).

In Equation (2), λ is the wavelength, L is the thickness of the holographic recording medium, n is the refractive index of the holographic recording medium, θs is the incident angle of the signal beam on the holographic recording medium, and θr is the incident angle of the reference beam on the holographic recording medium. For λ=532 nm, L=1 mm, n=1.5, θs=6.6°, θr=12.4° to 0°, and δθ=0.158° (2.76 mrad) to 0.44° (7.8 mrad), δYi=f·δθ=0.242 mm to 0.686 mm is obtained and the multiplicity is calculated as sixty-four.

Accordingly, each line can be recorded and reproduced by in accordance with the position of the reference beam.

The method of multiplexed recording is not limited to the above-described angular multiplexing method, and multiplexed recording may also be performed by, for example, a shifting method in which the holographic recording medium 20 is moved in the planar direction.

Next, a holographic recording/reproducing apparatus according to a second embodiment of the present invention which uses a holographic recording medium having a reflective film will be described below.

Second Embodiment

Figure 11:
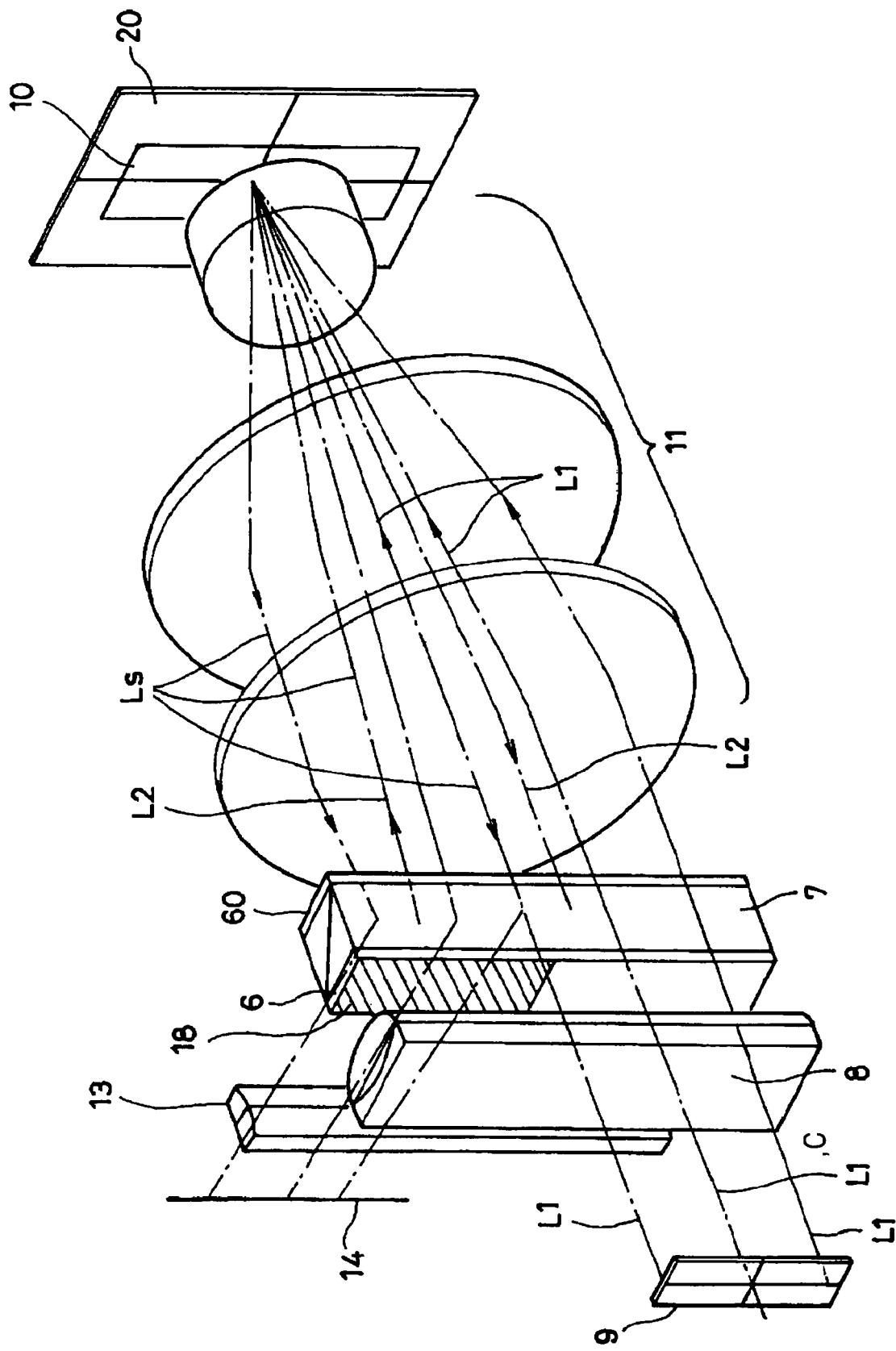
FIG. 11 is a schematic diagram showing the construction of a holographic recording/reproducing apparatus according to a second embodiment of the present invention.

FIG. 11 is a schematic diagram showing a holographic recording/reproducing apparatus according to a second embodiment of the present invention. However, the present invention is not limited to this.

Similar to the apparatus shown in FIG. 1, the holographic recording/reproducing apparatus of the second embodiment also includes a laser source 1; a beam expander 2; a half-wave plate 3; a polarization beam splitter 4 which serves as a splitter unit for splitting a laser beam along two optical paths; and an anamorphic prism 5. In addition, a half-wave plate 15, a mirror 16, and a cylindrical lens 17 are disposed on an optical path split by the polarization beam splitter 4 which serves as the splitter unit. However, these components are not shown in FIG. 11.

In FIG. 11, components similar to those shown in FIGS. 1 and 2 are denoted by the same reference numerals, and redundant explanations are omitted. As described above, a holographic recording medium 20 used in the second embodiment has a reflective film, and the second lens system 12 used in the first embodiment is omitted in the second embodiment.

In addition, a quarter-wave plate 60 is disposed on the surface of a polarization beam splitter 7 which is opposite to that on which a quarter-wave plate 6 is provided.

In the above construction, similar to the case described above with reference to FIGS. 1 and 2, a first laser beam L1 from the anamorphic prism (not shown) is guided into the lower half region of the of the polarization beam splitter 7 and a second laser beam L2 from the cylindrical lens (not shown) is guided into the upper half region of the polarization beam splitter 7.

Similar to the case described above with reference to FIGS. 1 and 2, the first laser beam L1 is reflected by the polarization beam splitter 7, passes through the quarter-wave plate 6 and a cylindrical lens 8, and is directed onto a spatial light modulator 9, for example, an GLV array, where the first laser beam L1 is modulated in accordance with information to be recorded. Then, the reflected beam passes through the cylindrical lens 8 and the quarter-wave plate 6. Since the first laser beam L1 passes through the quarter-wave plate 6 twice in opposite directions, the polarization plane thereof rotates by 90°. Accordingly, the first laser beam L1 passes through the polarization beam splitter 7. Then, the first laser beam L1 passes through the quarter-wave plate 60, is guided into the first lens system 11 in one of the half-regions separated along the optical axis thereof, and is directed onto the holographic recording medium 20 via the aperture in the limiting plate 10.

Although the second laser beam L2 is also reflected by the polarization beam splitter 7, it is reflected by a reflective surface 18 formed on the outer face of the quarter-wave plate 6 and passes through the quarter-wave plate 6 again. Since the second laser beam L2 passes through the quarter-wave plate 6 twice in opposite directions, the polarization plane thereof rotates by 90°. Accordingly, the second laser beam L2 passes through the polarization beam splitter 7. Then, the second laser beam L2 passes through the quarter-wave plate 60, is guided into the first lens system 11 in the other one of the half-regions separated along the optical axis thereof, and is directed onto the holographic recording medium 20 via the aperture in the limiting plate 10.

Accordingly, the information is recorded on the holographic recording medium 20.

When the thus recorded information is reproduced, only the reference beam is directed onto the holographic recording medium 20, and a reproduction beam Ls corresponding to the signal beam in the recording process is generated in accordance with the information recorded on the holographic recording medium 20. The reproduction beam Ls is reflected toward the polarization-beam splitter 7, passes through the quarter-wave plate 60, and is reflected by the polarization beam splitter 7. Then, the reproduction beam Ls passes through the cylindrical lens 13 and is guided into the sensor 14, and the recorded information is reproduced as an electric signal.

Also in this case, angular multiplexed recording can be performed by moving the mirror 16 and the cylindrical lens 17 (not shown) and changing the position of the reference beam, that is, the laser beam L2, in FIG. 11.

In addition, also in this case, the divergent angles θ1 and θ2 of the signal beam and the reference beam, respectively, on the first lens system 11 are set to the same angle.

Figure 12:
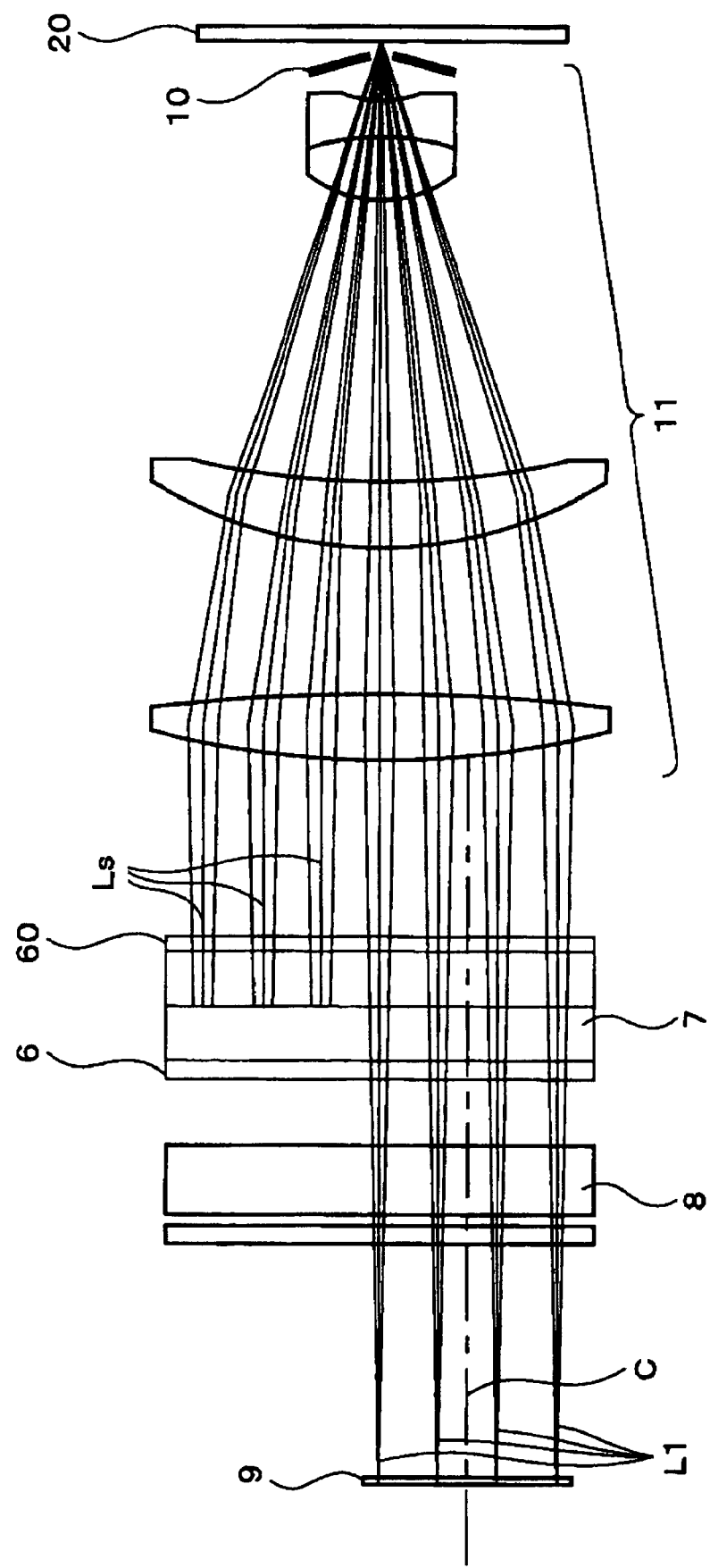
FIG. 12 is a side view showing optical paths in the holographic recording/reproducing apparatus according to the second embodiment.
Figure 13:
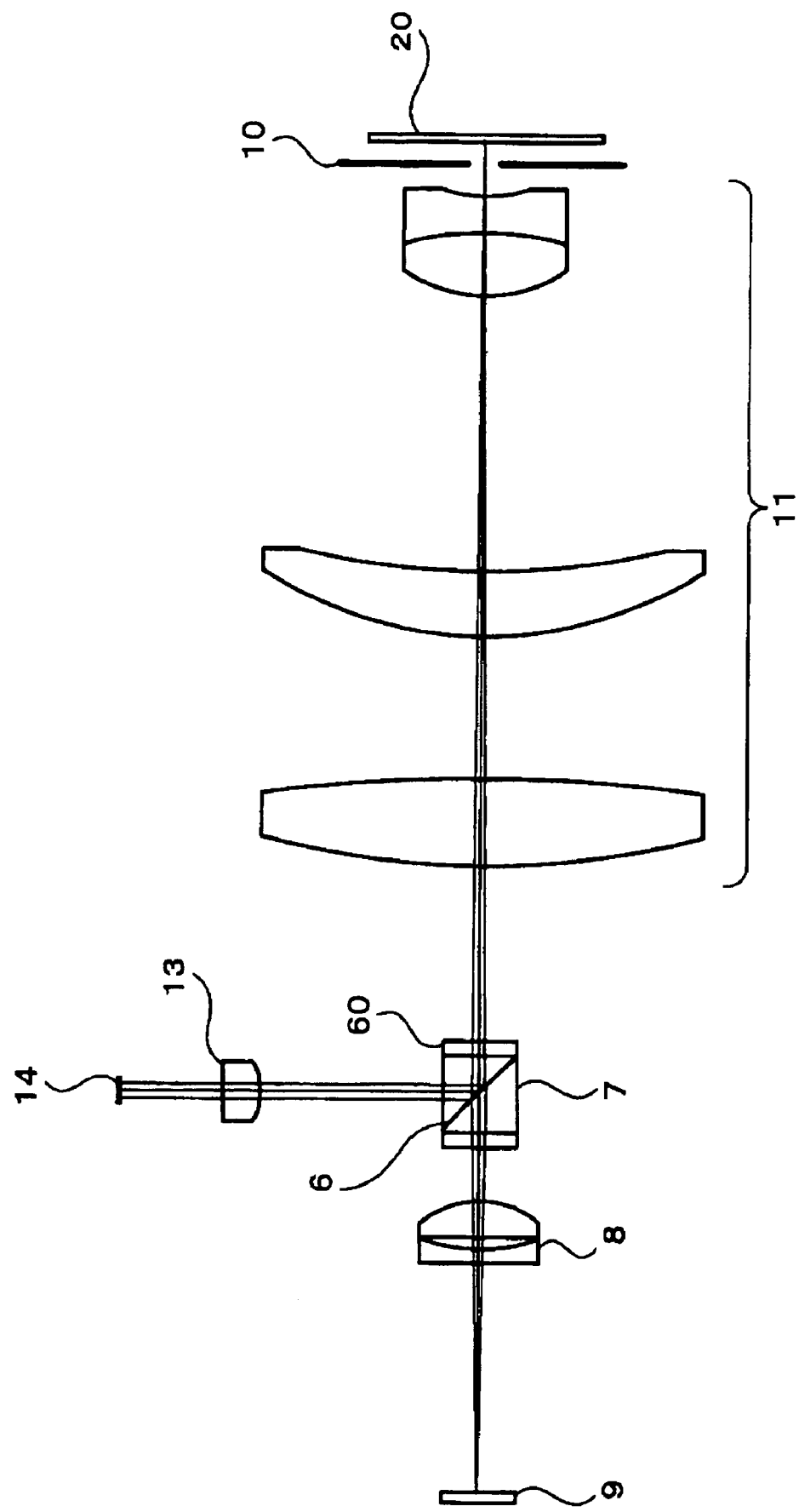
FIG. 13 is a plan view showing the optical paths in the holographic recording/reproducing apparatus according to the second embodiment.
Figure 14:
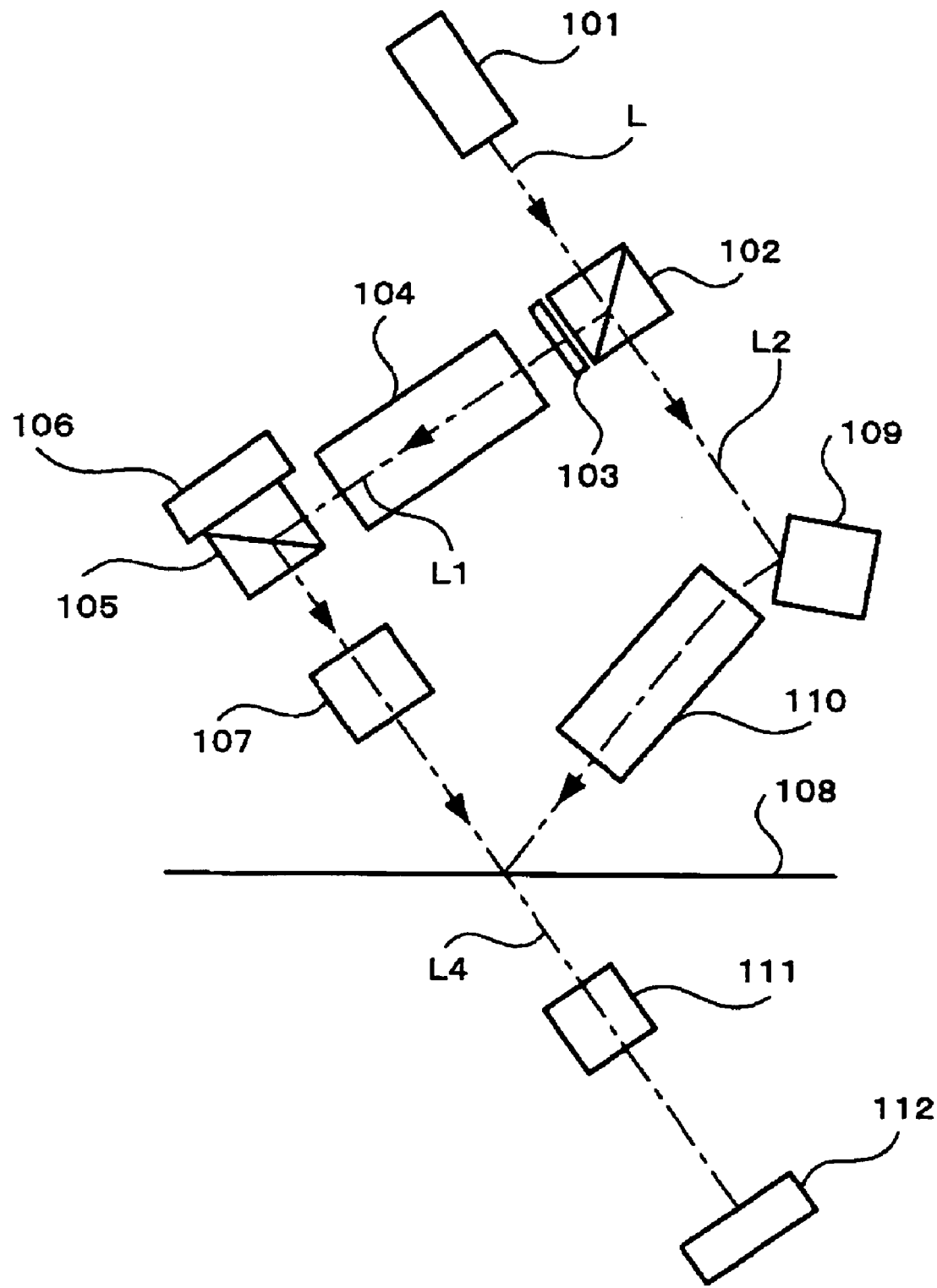
FIG. 14 is a diagram showing the construction of a known holographic recording/reproducing apparatus.

FIGS. 12 and 13 are a side view and a plan view, respectively, showing the optical paths of the first and the second laser beams L1 and L2 in the holographic recording/reproducing apparatus according to the second embodiment. Also in the second embodiment, the laser beams L1 and L2 are focused by the common lens system 11. In addition, similar to the case described above with reference to FIGS. 4, 5B, etc., the laser beams L1 and L2 are guided through one and the other half-regions of this lens system 11.

In FIGS. 12 and 13, components similar to those in FIG. 1 are denoted by the same reference numerals and redundant explanations are omitted.

In the second embodiment, the sensor 14 and the spatial light modulator 9 are disposed in different directions from the polarization beam splitter 7. However, when, for example, the spatial light modulator 9 is formed on a semiconductor substrate 31 composed of silicon or the like, the sensor 14 composed of a solid-state imaging device such as a CCD may also be disposed on this semiconductor substrate 31 in a monolithic or hybrid structure. When the spatial light modulator 9 and the sensor 14 are disposed on the same side with respect to the polarization beam splitter 7, that is, on the side adjacent to the quarter-wave plate 6 in this manner, the quarter-wave plate 60 can be omitted.

When the holographic recording/reproducing apparatus having a reflective film is used as described above, the second lens system 12 included in the holographic recording/reproducing apparatus shown in FIG. 1, which uses a transmissive holographic recording medium, can be omitted.

In the above-described construction, although the holographic recording medium is reflective, the reference beam can be prevented from being received by the sensor since the direction in which the signal reproduction beam Ls is emitted from the holographic recording medium and the reflection direction of the reference beam are different from each other due to the difference in the incident direction between the signal beam L1 and the reference beam L2.

Reproducing Apparatus for Holographically Recorded Information

A holographic apparatus of holographically recorded information is constructed such that the optical path of the first laser beam L1 is omitted from the above-described holographic recording/reproducing apparatus.

The present invention is not limited to the above-described embodiments. For example, the spatial light modulator for modulating the laser beam is not limited to the spatial light modulator 9 with 1-dimensional structure, and a spatial light modulator with 2-dimensional structure may also be used. In addition, although the GLV array with high modulation efficiency and quick response time is used as the spatial light modulator 9, a Digital Micromirror Device™ (DMD™), a liquid crystal device, etc., may also be used.

In addition, the holographic recording method is not limited to that using the Fourier-transform lens, and a so-called f-θ lens may also be used as the lens systems 11 and 12. Accordingly, the present invention is not limited to the above-described embodiments and examples, and various modifications are possible.

What is claimed is:

1. A holographic recording/reproducing apparatus which either records or records and reproduces information holographically, the holographic recording/reproducing apparatus comprising:

a laser source;
a splitter unit which splits a laser beam from the laser source into a first laser beam for generating a signal beam and a second laser beam which serves as a reference beam;
a spatial light modulator which spatially modulates the first laser beam in accordance with the information to be recorded, the modulated first laser beam serving as the signal beam;
a positioning unit for positioning a holographic recording medium; and
a focusing lens system which focuses the signal beam and the reference beam onto the holographic recording medium,
wherein, in a recording process, the signal beam passes through the focusing lens system such that the central axis of the signal beam is in one of two half-regions separated along an optical axis of the focusing lens system and the reference beam passes through the focusing lens system in the other half-region which is free from the signal beam, the signal beam and the reference beam being focused onto the holographic recording medium so that the information is recorded on the holographic recording medium;
wherein the holographic recording medium is a transmissive holographic recording medium,
wherein the focusing lens system is a first lens system and the holographic recording/reproducing apparatus further comprises a second lens system which faces the first lens system across the positioning unit,
wherein, in the recording process, the signal beam passes through the focusing lens system such that the central axis of the signal beam is in one of the half-regions separated along the optical axis of the focusing lens system and the reference beam passes through the focusing lens system in the other half-region which is free from the signal beam, the signal beam and the reference beam being focused onto the holographic recording medium so that the information is recorded on the transmissive holographic recording medium,
wherein, in a reproduction process of reproducing the information recorded on the holographic recording medium, the first laser beam is blocked and the reference beam is directed onto the holographic recording medium at the same incident position and incident angle as those of the reference beam in the recording process so that a signal reproduction beam corresponding to the signal beam is generated in accordance with the information recorded on the holographic recording medium, the signal reproduction beam being guided through the second lens system such that the signal reproduction beam is point symmetric to the signal beam in the recording process across the holographic recording medium;
further comprising an optical component including a quarter-wave plate and a polarization beam splitter which are integrated with each other, the optical component being disposed on an optical path between the spatial light modulator and the focusing lens system and the quarter-wave plate having a reflective surface on a part of the outer face thereof,
wherein the first and the second laser beams split by the splitter unit are guided into the optical component and are reflected by the polarization beam splitter,
wherein the first laser beam reflected by the polarization beam splitter passes through the quarter-wave plate toward the spatial light modulator, is modulated by the spatial light modulator, passes through the quarter-wave plate and the polarization beam splitter, and is incident on the focusing lens system, and wherein the second laser beam reflected by the polarization beam filter passes through the quarter-wave plate, is reflected by the reflective surface, passes through the quarter-wave plate and the polarization beam splitter, and is incident on the focusing lens system.

2. A holographic recording/reproducing apparatus according to claim 1, wherein the spatial light modulator and the holographic recording medium are at the front focal point and the rear focal point, respectively, of the focusing lens system, and wherein the divergent angle of the reference beam incident on the focusing lens system is set to an angle corresponding to the divergent angle of the signal beam on the focusing lens for a single pixel.

3. A holographic recording/reproducing apparatus according to claim 1, wherein the spatial light modulator has a diffraction grating structure including a plurality of reflective ribbons and performs phase modulation of the first laser beam which reaches the reflective ribbons in accordance with the positions of the reflective ribbons.

4. A holographic recording/reproducing apparatus according to claim 1, wherein angular-multiplexed recording is performed by moving the reference beam in the direction perpendicular to the optical axis of the focusing lens system while the reference beam is maintained parallel to the optical axis of the focusing lens system.

5. A holographic recording/reproducing apparatus which either records or records and reproduces information holographically, the holographic recording/reproducing apparatus comprising:

a laser source;

a splitter unit which splits a laser beam from the laser source into a first laser beam for generating a signal beam and a second laser beam which serves as a reference beam;

a spatial light modulator which spatially modulates the first laser beam in accordance with the information to be recorded, the modulated first laser beam serving as the signal beam;

a positioning unit for positioning a holographic recording medium; and a focusing lens system which focuses the signal beam and the reference beam onto the holographic recording medium, wherein, in a recording process, the signal beam passes through the focusing lens system such that the central axis of the signal beam is in one of two half-regions separated along an optical axis of the focusing lens system and the reference beam passes through the focusing lens system in the other half-region which is free from the signal beam, the signal beam and the reference beam being focused onto the holographic recording medium so that the information is recorded on the holographic recording medium, wherein the holographic recording medium has a reflective film, wherein, in the recording process, the signal beam passes through the focusing lens system such that the central axis of the signal beam is in one of the half-regions separated along the optical axis of the focusing lens system and the reference beam passes through the focusing lens system in the other half-region which is free from the signal beam, the signal beam and the reference beam being focused onto the holographic recording medium so that the information is recorded on the holographic recording medium having the reflective film, wherein, in a reproduction process of reproducing the information recorded on the holographic recording medium, the first laser beam is blocked and the reference beam is directed onto the holographic recording medium at the same incident position and incident angle as those of the reference beam in the recording process so that a signal reproduction beam corresponding to the signal beam is generated in accordance with the information recorded on the holographic recording medium, the signal reproduction beam being guided through the focusing lens system such that the signal reproduction beam is symmetric to the signal beam in the recording process about the optical axis of the focusing lens system, further comprising an optical component including a quarter-wave plate and a polarization beam splitter which are integrated with each other, the optical component being disposed on an optical path between the spatial light modulator and the focusing lens system and the quarter-wave plate having a reflective surface on a part of the outer face thereof, wherein the first and the second laser beams split by the splitter unit are guided into the optical component and are reflected by the polarization beam splitter, wherein the first laser beam reflected by the polarization beam splitter passes through the quarter-wave plate toward the spatial light modulator, is modulated by the spatial light modulator, passes through the quarter-wave plate and the polarization beam splitter, and is incident on the focusing lens system, and wherein the second laser beam reflected by the polarization beam filter passes through the quarter-wave plate, is reflected by the reflective surface, passes through the quarter-wave plate and the polarization beam splitter, and is incident on the focusing lens system.

6. A holographic recording/reproducing apparatus according to claim 5, further comprising an optical component including first and second quarter-wave plates and a polarization beam splitter which are integrated with one another such that the first and second quarter-wave plates face each other across the polarization beam splitter, the optical component being disposed on an optical path between the spatial light modulator and the focusing lens system and the first quarter-wave plate having a reflective surface on a part of the outer face thereof, wherein the first and the second laser beams split by the splitter unit are guided into the optical component and are reflected by the polarization beam splitter, wherein the first laser beam reflected by the polarization beam splitter passes through the first quarter-wave plate toward the spatial light modulator, is modulated by the spatial light modulator, passes through the first quarter-wave plate, the polarization beam splitter, and the second quarter-wave plate, and is incident on the focusing lens system, and wherein the second laser beam reflected the polarization beam filter passes through the first quarter-wave plate, is reflected by the reflective surface, passes through the first quarter-wave plate, the polarization beam splitter, and the second quarter-wave plate, and is incident on the lens system, and wherein the signal reproduction beam from the holographic recording medium is guided through the second quarter-wave plate into the polarization beam splitter, is reflected by the polarization beam splitter in the direction opposite to that in which the first laser beam is guided into the polarization beam splitter in the recording process, and is guided into a sensor for the signal reproduction beam, wherein the holographic recording medium has a reflective film, wherein, in the recording process, the signal beam passes through the focusing lens system such that the central axis of the signal beam is in one of the half-regions separated along the optical axis of the focusing lens system and the reference beam passes through the focusing lens system in the other half-region which is free from the signal beam, the signal beam and the reference beam being focused onto the holographic recording medium so that the information is recorded on the holographic recording medium having the reflective film, and wherein, in a reproduction process of reproducing the information recorded on the holographic recording medium, the first laser beam is blocked and the reference beam is directed onto the holographic recording medium at the same incident position and incident angle as those of the reference beam in the recording process so that a signal reproduction beam corresponding to the signal beam is generated in accordance with the information recorded on the holographic recording medium, the signal reproduction beam being guided through the focusing lens system such that the signal reproduction beam is symmetric to the signal beam in the recording process about the optical axis of the focusing lens system.

7. A holographic recording/reproducing apparatus according to claim 5, wherein the spatial light modulator and the holographic recording medium are at the front focal point and the rear focal point, respectively, of the focusing lens system, and wherein the divergent angle of the reference beam incident on the focusing lens system is set to an angle corresponding to the divergent angle of the signal beam on the focusing lens for a single pixel.

8. A holographic recording/reproducing apparatus according to claim 5, wherein the spatial light modulator has a diffraction grating structure including a plurality of reflective ribbons and performs phase modulation of the first laser beam which reaches the reflective ribbons in accordance with the positions of the reflective ribbons.

* * * * *